UNITED STATES PATENT OFFICE.

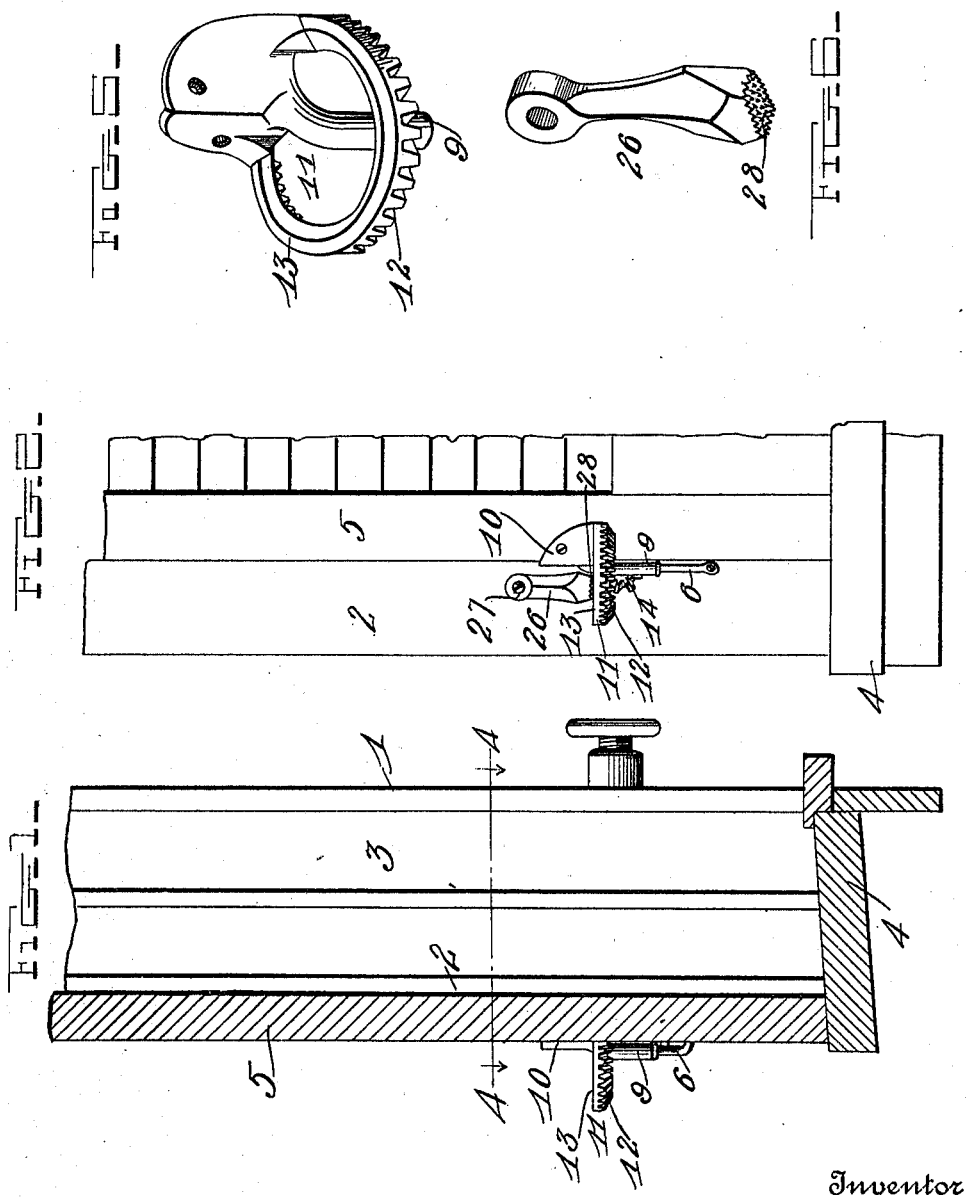

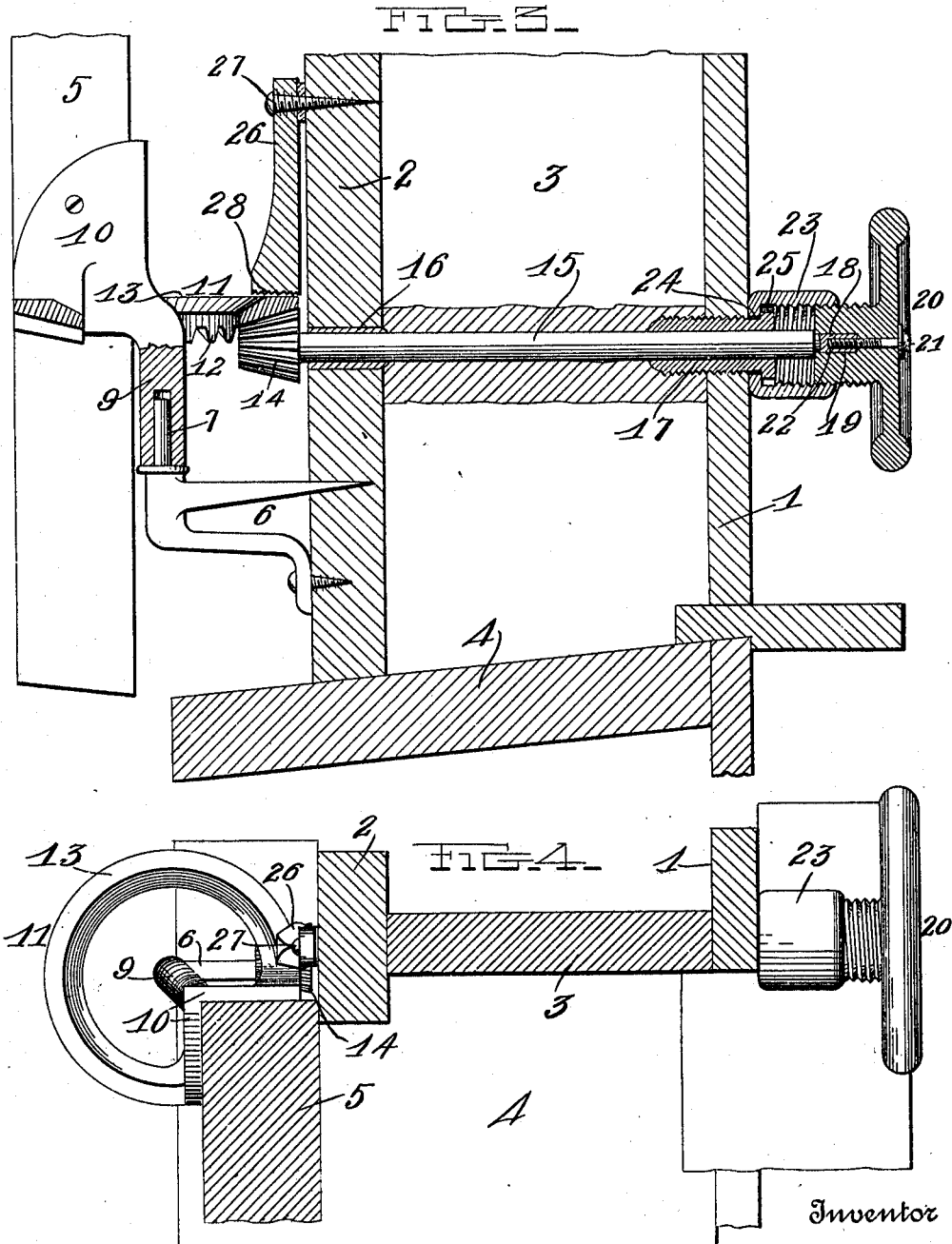

MARTIN W. SMITH, OF SOMERVILLE, MASSACHUSETTS.

SHUTTER-WORKER.

993,118.  Specification of Letters Patent.  Patented May 23, 1911.

Application filed January 12, 1911. Serial No. 602,257.

*To all whom it may concern:*

Be it known that I, MARTIN W. SMITH, a citizen of the United States, residing at Somerville, in the county of Middlesex and State of Massachusetts, have invented certain new and useful Improvements in Shutter-Workers; and I do declare the following to be a full, clear, and exact description of the invention, such as will enable others skilled in the art to which it appertains to make and use the same.

This invention relates to improvements in shutter workers.

One object of the invention is to provide a shutter worker by means of which the shutters or blinds of a window may be opened or closed from the inside.

Another object is to provide a shutter worker having means whereby the shutters may be locked in an open, closed or any intermediate position.

A further object is to provide a shutter worker the shutter member of which forms a part of the shutter member of one hinge.

From the foregoing description taken in connection with the accompanying drawings, the construction and operation of the invention will be readily understood without requiring a more extended explanation.

In the accompanying drawings: Figure 1 is a vertical section through a window sill showing a side view of a portion of a window frame and the outer edge of a shutter hinged thereto and provided with my improved shutter worker; Fig. 2 is an outside view of the lower part of a window frame and shutter showing the application of the invention, the shutter being in closed position; Fig. 3 is a central vertical sectional view; Fig. 4 is a horizontal sectional view on the line 4—4 of Fig. 1; Fig. 5 is a perspective view of the combined hinge and shutter member of the device; Fig. 6 is a similar view of the locking pawl for fastening the shutter in an open, closed or any intermediate position and for preventing the casual removal of the shutter from the window frame.

Referring more particularly to the drawings, 1 denotes the inside casing and 2 the outside casing, 3 the jamb and 4 the sill of a window frame, said parts being of the usual or any suitable construction and having the usual stop and parting beads for the window sash. To the outer casing 2 of the frame is hingedly connected the shutter 5 the supporting hinges of which comprise frame members 6 which are in the form of brackets having upwardly projecting pintles 7 with which are removably engaged the blind members 9 of the hinge. The upper blind member may be of the usual form of blind hinge member while the lower member 9 is preferably formed as a part of the blind member of my improved shutter worker. The lower blind member or shutter of the hinge comprises right angularly disposed attaching plates 10 which are engaged with the inner corner of the outer edge of the shutter and secured thereto by screws or other suitable fastening devices. On the corner of the plates 10 is formed an outwardly projecting vertically disposed inverted socket, forming the lower blind hinge member 9 and adapted to be engaged with the pintle 7 of the lower frame member 6. Formed on the plates 10 is a bevel gear segment 11 having on its lower side beveled teeth 12 and provided with a flat upper surface 13. The segment 11 is arranged concentric with the socket or hinge member 9 and is preferably disposed in a line with the upper end of the socket as shown.

Operatively engaged with the bevel teeth 12 of the segment 11 is a bevel gear pinion 14 which is fixedly mounted on or forms part of an operating stem or shaft 15 arranged in the adjacent side of the window casing and is slidably and revolubly mounted at its outer end in a sleeve or bushing 16 arranged in the outer casing 2 of the frame and at its inner end in a sleeve or bushing 17 arranged in the inner casing 1 of the frame. The inner end of the shaft or stem 15 projects beyond the inner sleeve 17 and has a reduced squared inner end or shank 18 which engages a squared socket 19 formed in an operating knob 20 which is secured to the shank by a screw 21 said screw being preferably inserted through the knob and engaged with a threaded socket 22 in the end of the shank as shown. The inner portion of the knob 20 is threaded on its outer surface and with said threaded surface of the knob is operatively engaged an interiorly threaded coupling socket 23 having on its inner end an inwardly projecting annular flange 24 which is engaged with the adjacent outer end of the sleeve or bushing 17, said end of the bushing having formed thereon an annular head 25 whereby said coupling is swiveled or loosely connected to the bushing. By providing a screw threaded connection between the socket 23 and the knob 20 and loosely connecting the inner end of the socket to the sleeve 17 the knob 20 and stem 15 of the beveled gear pinion 14 may be shifted inwardly or outwardly by turning the socket 23 in one direction or the other thereby shifting the bevel gear inwardly or outwardly thus raising or lowering the gear segment and shutter to a slight extent for a purpose hereinafter described. By turning the knob 20 in one direction or the other the stem 15 and beveled gear pinion will be revolved in one direction or the other thereby turning the gear segment 11 and swinging the shutter to an open or closed or any intermediate position.

In order to prevent the casual removal of the shutter or disengagement thereof from the hinge members of the casing I provide a locking pawl 26 which is pivotally secured to the outside casing above the gear segment 11 by means of a pivot screw or other suitable fastening means 27. When thus supported the lower end of the pawl will be disposed immediately above the flat upper surface 13 of the gear segment and will thus prevent the raising of the same to a sufficient extent to disengage the blind members of the hinge from the frame members thereof. The pawl 26 also serves as a means for locking the shutter in an open, closed or any intermediate position and to accomplish this purpose the socket 23 is turned in the proper direction for drawing the knob 20 inwardly thus forcing the stem 15 and beveled gear pinion 14 outwardly whereby the beveled surface of the pinion will raise the gear segment 11 a sufficient extent to bind the flat upper surface thereof into locking engagement with the lower end of the pawl whereby the latter will lock or hold the shutter in its open or closed position. In order to cause a firm grip between the lower end of the pawl and the flat upper surface of the segment 11 I preferably provide the lower end of the pawl with a roughened or serrated surface 28. In order to again release the shutter to permit the opening and closing movement thereof the socket 23 is turned in a reverse direction thereby moving the knob 20 outwardly and drawing the stem 15 and beveled gear pinion 14 inwardly thus permitting the segment and shutter to lower and thus disengage the upper surface of the segment from the lower end of the pawl.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as defined in the appended claims.

Having thus described my invention, what I claim is:

1. A shutter worker comprising a segmental gear adapted to be secured to a shutter, said gear having a flat upper surface, a bevel gear pinion operatively engaged with said segment, an operating stem formed on said gear, said stem adapted to have a sliding and revoluble engagement with a window casing, a locking pawl adapted to be pivotally secured to the outer side of the window casing above said segmental gear, and means arranged on the inner end of said bevel gear stem whereby the latter and the bevel gear may be revolved to open and close the shutter and whereby said bevel gear may be projected and retracted thereby raising the segmental gear into or lowering it out of engagement with said locking pawl to lock or release the shutter in an open or closed position.

2. In a shutter worker a segmental gear adapted to be secured to a window shutter, a bevel gear pinion operatively engaged with said segment, a stem formed on said pinion, bushings adapted to be arranged in the inner and outer casings of a window frame and adapted to slidably and revolubly support said pinion, an exteriorly threaded operating knob secured to the inner end of said stem, an interiorly threaded socket having a threaded engagement with said knob and a revoluble interlocking engagement with the adjacent end of said inner bushing whereby when said socket is turned in one direction or the other the threaded engagement thereof with the knob on the pinion operating stem will project or retract said pinion thereby raising or lowering the segmental gear on the shutter, and a pivoted locking pawl adapted to be arranged on the window casing above said segmental gear and adapted to be engaged thereby when the latter is raised thus locking the shutter in an open or closed position and preventing the casual removal of the shutter.

In testimony whereof I have hereunto set my hand in presence of two subscribing witnesses.

MARTIN W. SMITH.

Witnesses:
MARTHA E. DANIELS,
ANNA F. LEACH.